Mar. 6, 1923.
W. T. TRAVIS ET AL
1,447,912
CONVEYER FOR POTATO HARVESTERS
Filed July 22, 1921
6 sheets-sheet 3
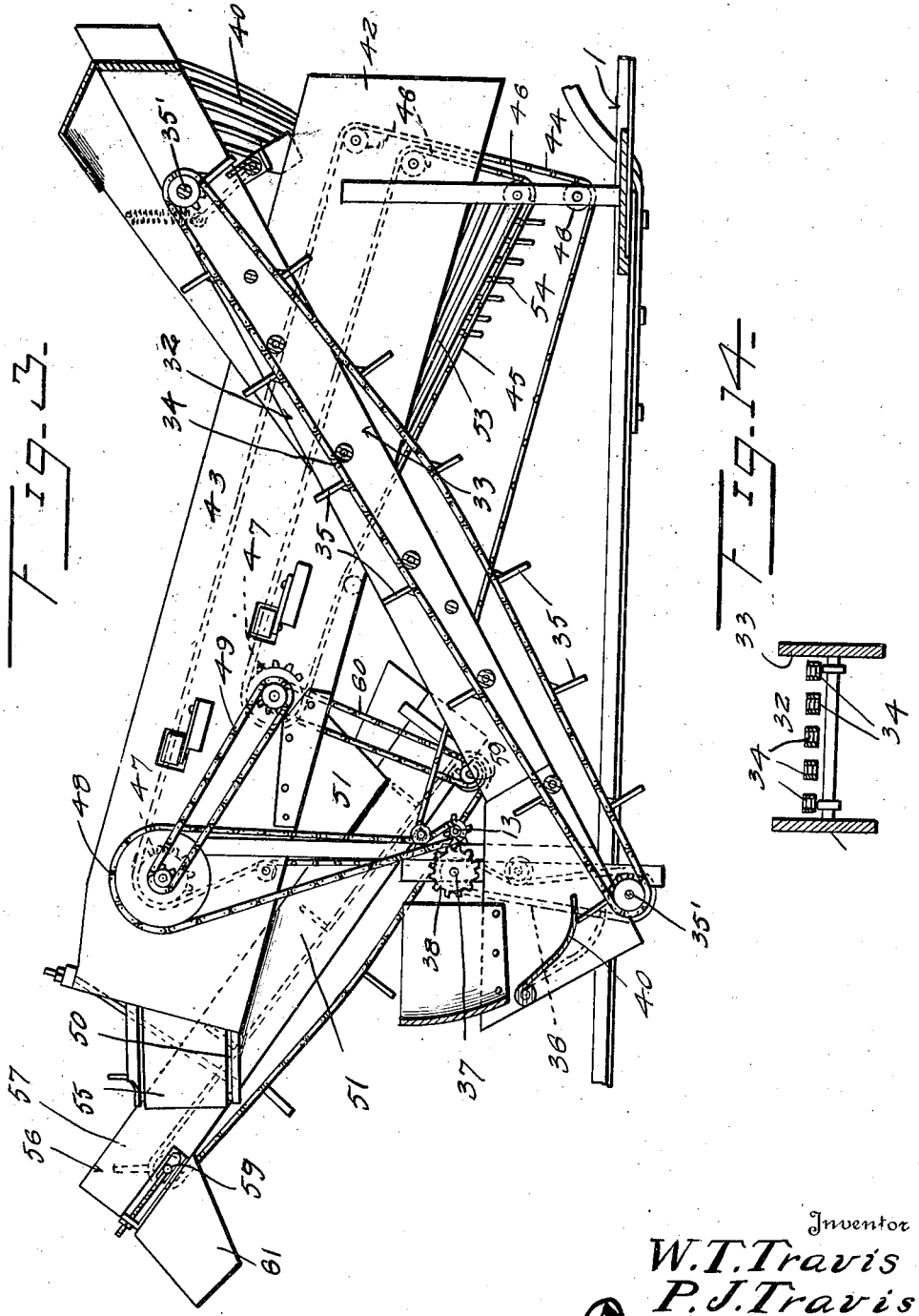
Inventor
W.T.Travis
P.J.Travis
By
Attorney

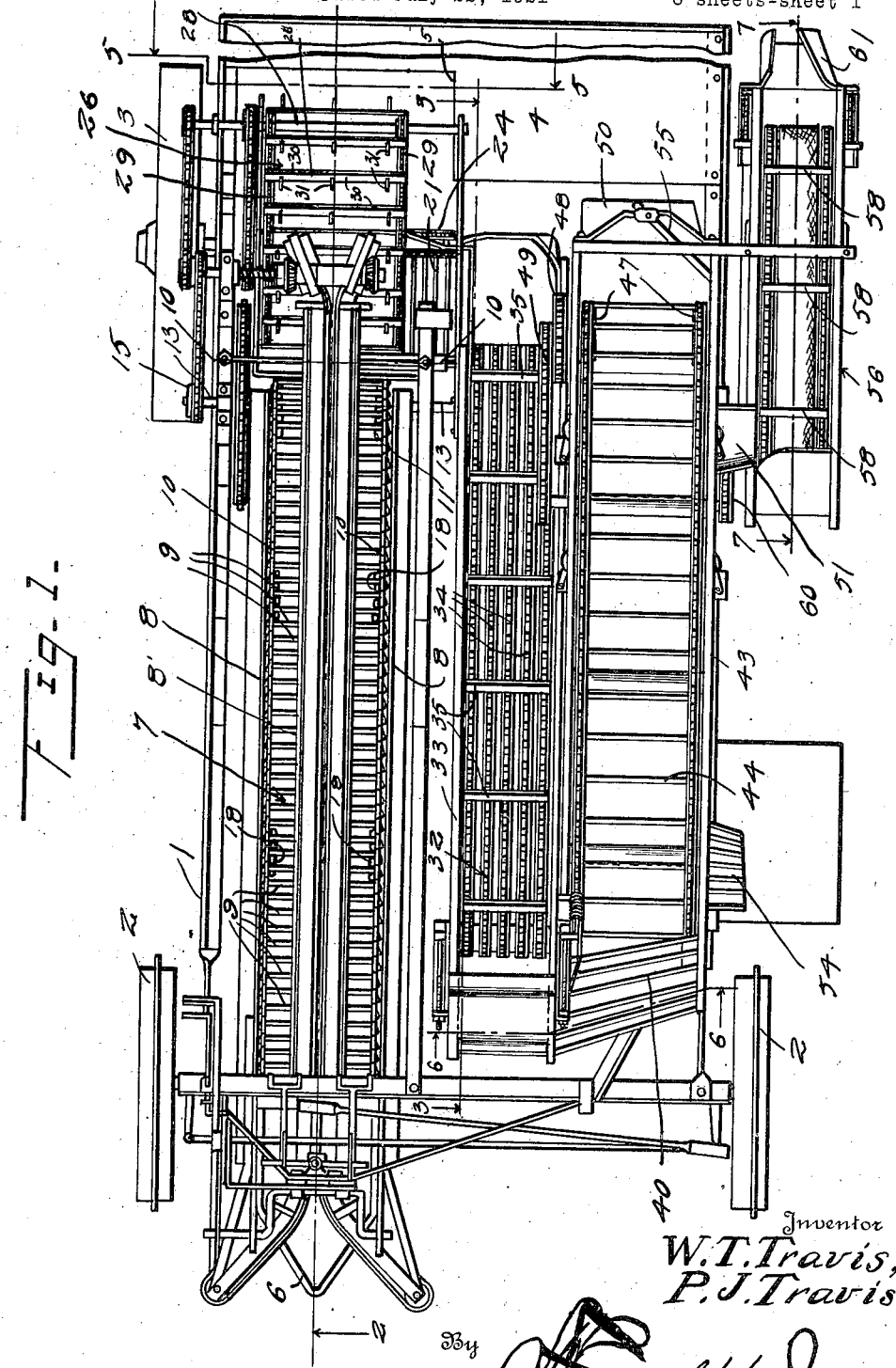

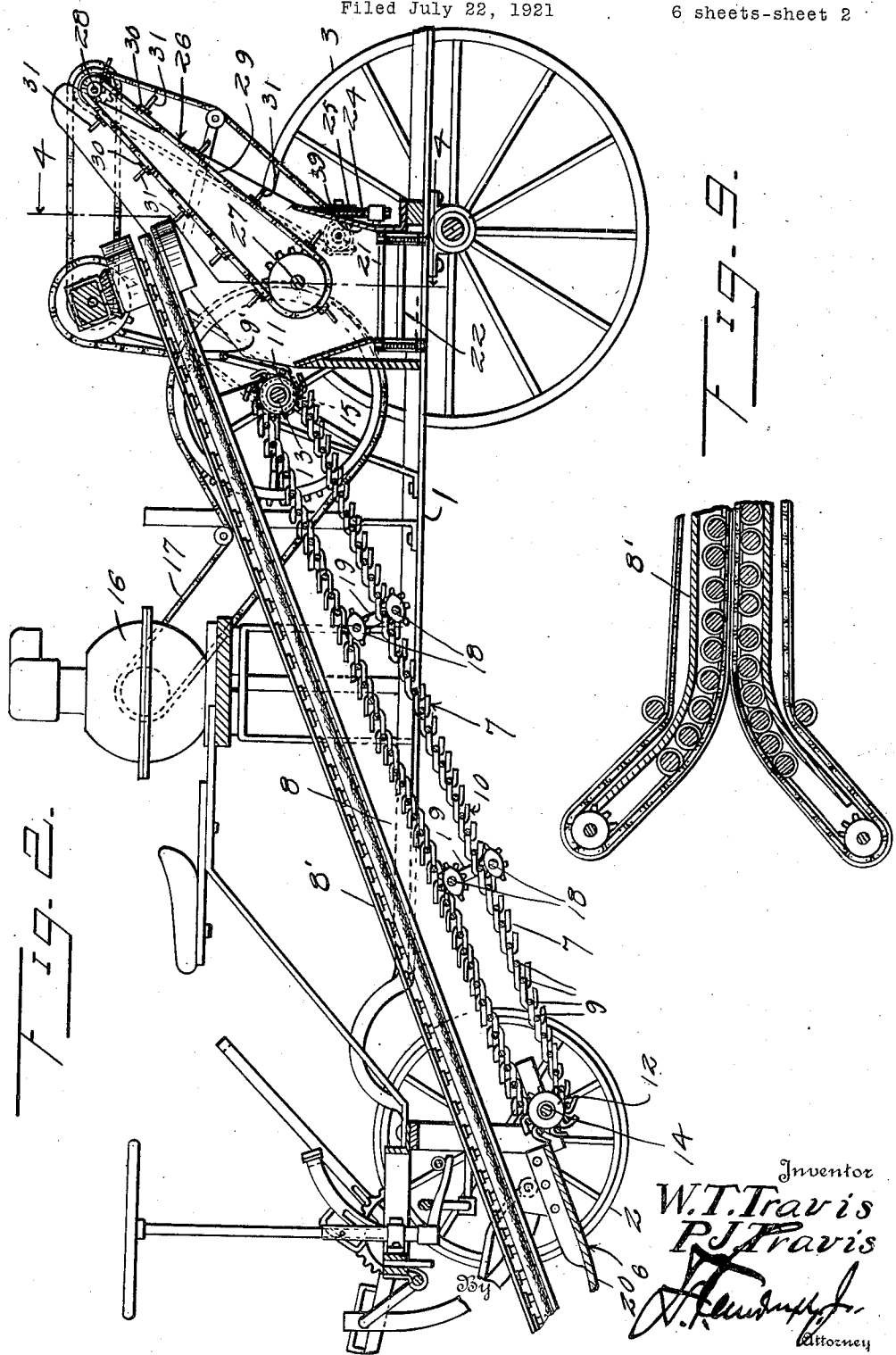

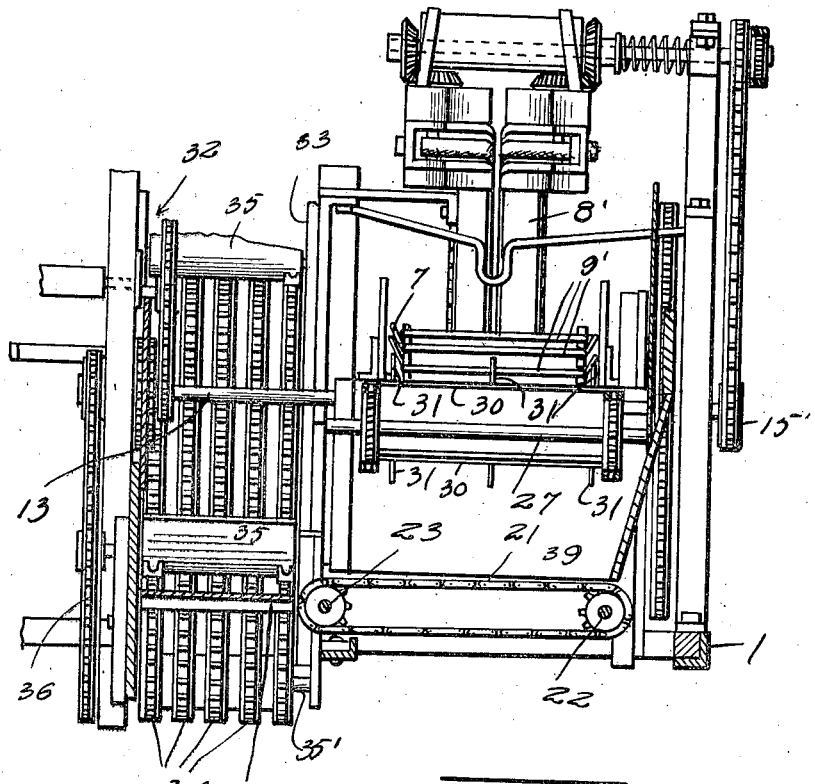
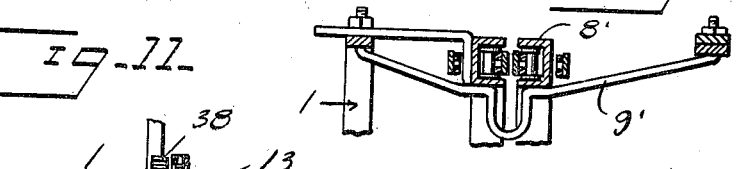
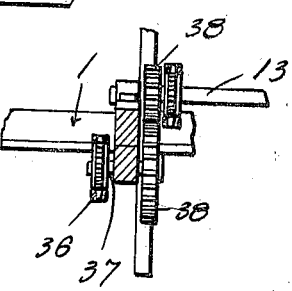

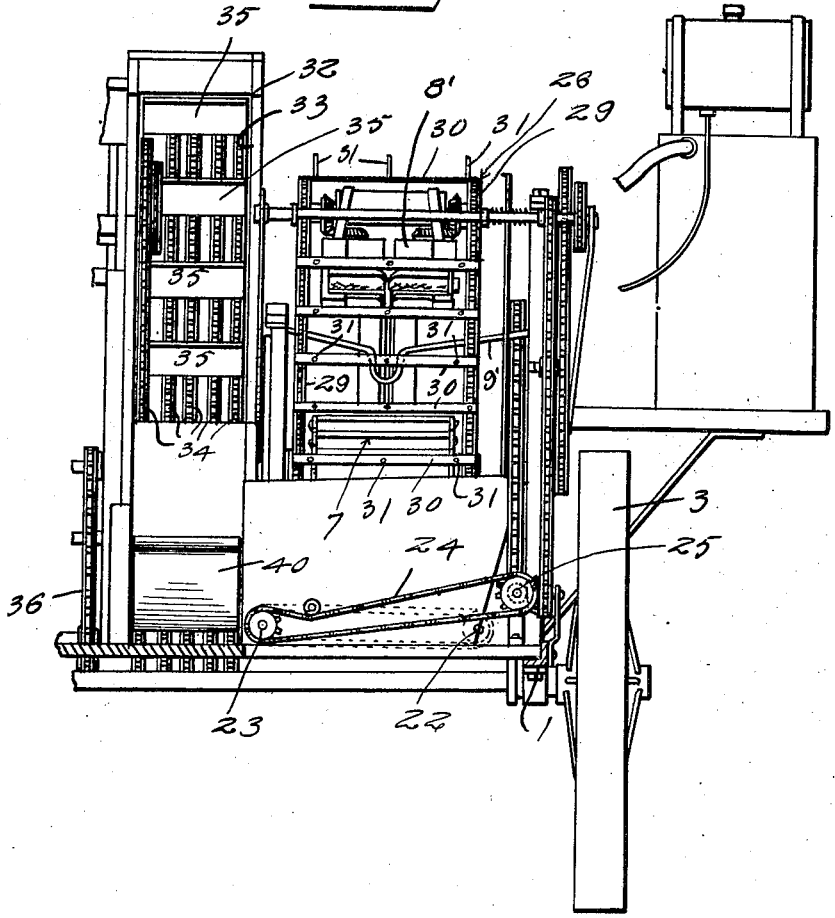
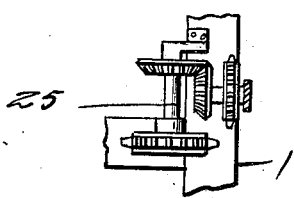
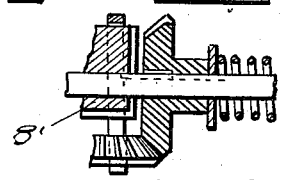

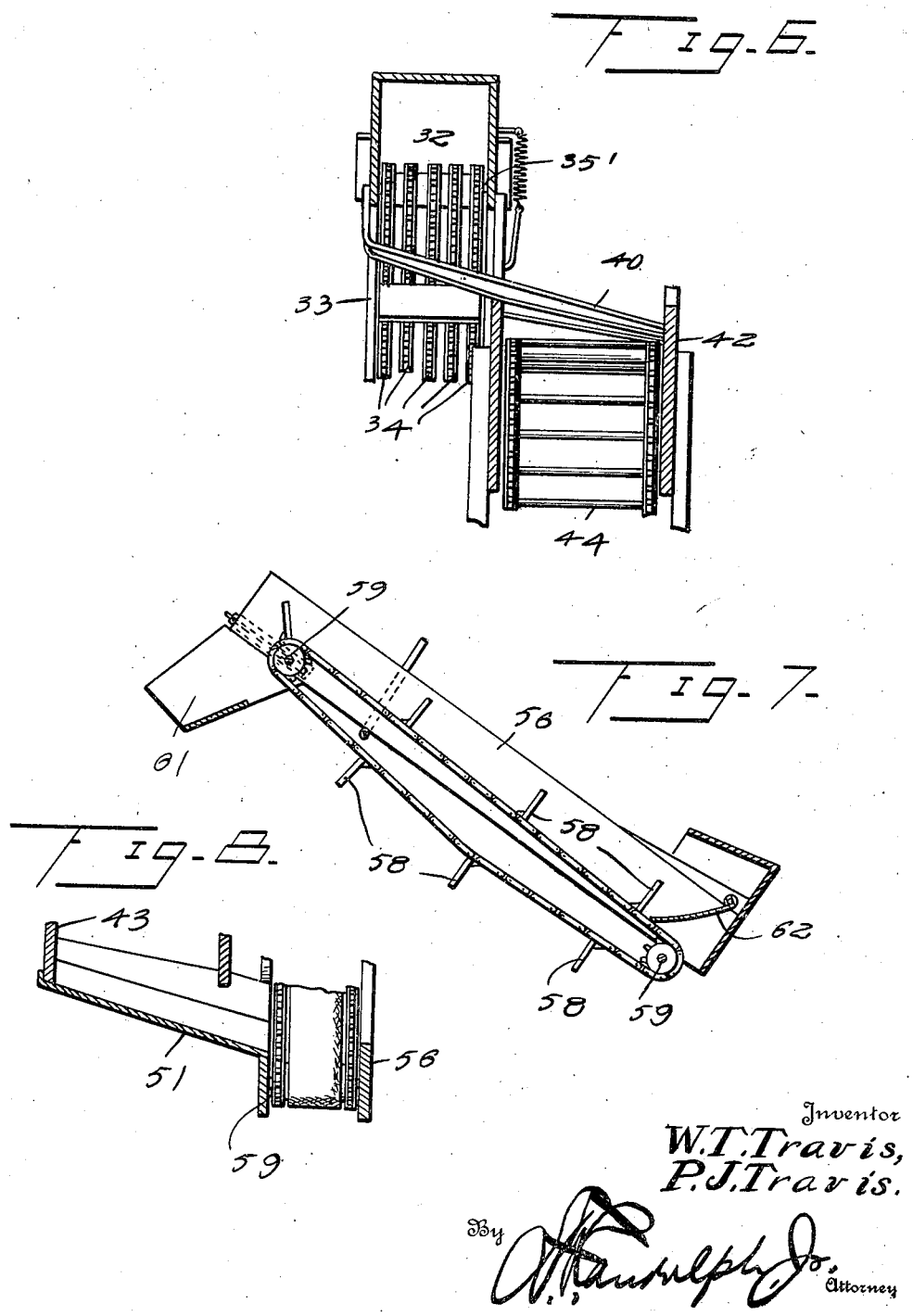

Patented Mar. 6, 1923.

1,447,912

UNITED STATES PATENT OFFICE.

WILLIAM T. TRAVIS AND PAUL J. TRAVIS, OF OYSTER, VIRGINIA.

CONVEYER FOR POTATO HARVESTERS.

Original application filed August 26, 1920, Serial No. 406,227. Divided and this application filed July 22, 1921. Serial No. 486,845.

*To all whom it may concern:*

Be it known that we, WILLIAM T. TRAVIS and PAUL J. TRAVIS, citizens of the United States, residing at Oyster, in the county of Northampton and State of Virginia, have invented certain new and useful Improvements in Conveyers for Potato Harvesters; and we do hereby declare the following to be a full, clear, and exact description of the invention, such as will enable others skilled in the art to which it appertains to make and use the same.

This invention relates to improvements in potato harvesters, being a division of our application filed August 26th, 1920 and serially numbered 406,227 and has for its primary object the provision of a conveying means, between the digging mechanism, cleaning device, assorter and the final discharge chutes, and which is adapted to deliver the potatoes from one of the above devices to the other without the vines.

With these and other objects in view as will become more apparent as the description proceeds, the invention consists in certain novel features of construction, combination, and arrangement of parts as will be hereinafter more fully described and claimed.

For a complete understanding of our invention, reference is to be had to the following description and accompanying drawings, in which:—

Figure 1 is a top plan view, illustrating the potato harvester in which the conveying means is involved, Figure 2 is a longitudinal sectional view illustrating the device, Figure 3 is a sectional view illustrating the cleaner next to the assorter, Figure 4 is a transverse sectional view taken on the line 4—4 of Figure 2, Figure 5 is a fragmentary rear elevation illustrating the means of conveying potatoes to the cleaner and taken on line 5—5 of Figure 1, Figure 6 is a detail sectional view illustrating a potato chute, Figure 7 is a sectional view illustrating a discharge conveyer taken on line 7—7 of Figure 1, Figure 8 is a detail sectional view, illustrating another potato chute, Figure 9 is a fragmentary sectional view, illustrating a vine conveyer, Figure 10 is a detail sectional view illustrating a knife bar, Figure 11 is a detail sectional view illustrating a drive gearing, Figure 12 is a sectional view illustrating the drive for the vine conveyer, Figure 13 is a sectional view, illustrating a drive for the transverse conveyer, Figure 14 is a transverse sectional view illustrating the cleaner.

Referring in detail to the drawings, the numeral 1 indicates a frame supported by a pair of front and rear wheels 2 and 3 and the front wheels are so attached to the frame that the device may be conveniently steered. The frame 1 is provided at its rear end with a platform 4 on which the operator may stand and is provided with a vine receiving opening 5 which is adapted to receive the vines after the potatoes have been removed therefrom and permit said vines to fall onto the ground or into a receptacle if desired.

The frame 1 supports at one side thereof a digging mechanism 6 including an endless conveyer 7 which inclines upwardly and rearwardly in respect to the frame and operate between side boards 8. The conveyer is constructed from a plurality of relatively spaced transversely extending rods 9 having their ends connected by endless chains 10 that are trained over upper and lower sprocket wheels 11 and 12. The sprocket wheels 11 and 12 are secured to shafts 13 and 14 journaled to the frame 1 and the shaft 13 constitutes the driving shaft and has secured thereto a sprocket wheel 15 which has motion imparted thereto from a power source 16 by means of an endless chain 17. The conveyer 7 during its rotation has a vibratory motion transmitted thereto by means of vibrating gears 18 carried by brackets 19 on the frame 1 for the purpose of causing dirt adhering to the potatoes to become dislodged and fall through the conveyer onto the ground. The lower forward end of the conveyer 7 is associated with a plow 20 adapted to dig the potatoes from the ground by the forward motion of the harvester and to deposit the potatoes with the dirt onto the conveyer. The potatoes pass upwardly on the conveyer 7 and are deposited onto a transverse conveyer 21 which is located in a plane below the upper end of the conveyer 7 and is supported by shafts 22 and 23 and the shaft 23 is driven by an endless chain 24 which is in turn driven by a shaft 25. The last named shaft is driven by the drive shaft 13.

A vine conveyer 8' is disposed over the conveyer 7 to carry the vines rearwardly with the potatoes and has a knife bar 9' at its rear ends to remove the potatoes from the vines to permit them to fall onto the conveyer 21 and the vines are caught by a conveyer 26.

Associated with the upper end of the digging mechanism 6 or the conveyer 7, is the vine conveyer 26 which travels over shafts 27 and 28 and includes side chains 29 connected by transverse bars 30, and the latter are provided with teeth 31 adapted to catch into the vines as they reach the upper end of the conveyer 7 and carry said vines upwardly and rearwardly and discharge them into the vine receiving opening 5 in the platform 4. The potatoes while on the transverse conveyer 21 still have a considerable amount of dirt adhering thereto and said potatoes are delivered from the transverse conveyer onto the lower end of an upwardly and forwardly inclined cleaner 32. The cleaner 32 consists of a trough 33 in which operates a series of endless chains 34 connected by transverse flights 35 which are adapted to move with the endless chains and carry the potatoes to the upper end of the trough 33. The chains 34 operate over shafts 35' and one of said shafts receives rotation from an endless chain 36 which is driven by a shaft 37 carried by the frame 1 and said shaft is driven by the shaft 13 by gears 38. The transverse conveyer 21 operates in a trough 39 which communicates with the trough 33 and at the juncture of said trough an oscillating gate 40 is provided. The gate 40 is pivotally mounted as shown in the drawings and its free end contacts with the flights of the cleaner during their movements with the chains 34 and cause the gate to raise upwardly and fall as soon as the same becomes disengaged from a flight thereby causing an oscillatory movement of said gate and sufficient to keep the potatoes agitated and properly distributed onto the lower end of the cleaner from the transverse conveyer. The cleaner also acts as a conveying medium for carrying the potatoes from the transverse conveyer located at the rear portion of the frame 1 to a transversely extending chute 40' located at the upper end of the trough 33 and at the forward end of the machine or frame 1. The chute 40' is constructed from a series of spaced rods 41 which are inclined downwardly to direct the potatoes onto an assorter 42 and which is inclined in an opposite direction to the cleaner and towards the rear end of the machine.

The assorter 42 consists of a trough 43 in which is mounted assorting aprons 44 and 45. The assorting aprons 44 and 45 are of different size and the upper run of the assorting apron 44 is disposed over the upper run of the assorting apron 45 so that the potatoes pass from the chute 40' onto the lower end of the apron 44. The aprons 44 and 45 are mounted to travel over a series of rollers 46 and also sprocket wheels 47. The sprocket wheels 47 which support the apron 44 are driven by an endless chain 48 and which receives its motion from the drive shaft 13. The sprocket wheels for the apron 44 drive the sprocket wheels 47 for the apron 45 by means of an endless chain 49. The largest size potatoes are carried rearwardly in an upward direction by the upper run of the apron 44 and are deposited into a chute 50 while the smaller size potatoes fall through the apron 44 onto the apron 45 and are carried in an upward and rearward direction by said apron 45 and deposited into a chute 51. The potatoes which fall through the apron 45 fall onto an inclined table 53 which is constructed of a series of relatively spaced rods and pass therefrom by gravity into a transversely extending chute 54. The chute 54 projects from one side of the machine to a suitable receptacle for the purpose of catching the smallest potatoes. The largest potatoes received by the chute 50 are discharged in a suitable receptacle which may be located on the platform and if desired the chute 50 may have a double discharge end and a manually controlled gate 55 so that a person may direct the large size potatoes first into one of the discharge ends of the chute 50 and then into the other discharge and thereby permitting a pair of receiving receptacles to be used in conjunction with the chute 50 for the purpose of allowing one of the receptacles to be emptied while the other is filling.

A conveyer 56 is carried by the frame 1 and consists of a trough 57 having endless chains operating therein and which are connected by flights 58. The endless chains pass over shafts 59 and one of said shafts is driven by an endless chain 60 which is in turn driven by the vibrating roller 47, of the assorter. The conveyer 56 extends in a rearward direction and on an inclined plane and receives at its lower end the intermediate size potatoes from the chute 51, and said potatoes are carried upwardly and rearwardly and deposited into a chute 61 whence they may discharge into a suitable receptacle placed on the platform. Located at the forward and lower end of the conveyer 56 is an oscillating gate 62 similar in construction to the gate 40 for the purpose of keeping the potatoes agitated and evenly distributed onto the conveyer 56 from the chute 51.

From the foregoing description taken in connection with the accompanying drawings, it will be noted that a very efficient conveying system has been provided for transferring potatoes from a digging mechanism to a cleaning device, and from the latter to an assorter and from the latter to final discharge chutes so that when the potatoes discharge from said discharge chutes they are graded to their sizes and free of dirt and vines.

While we have shown and described the preferred embodiment of our invention, it will be understood that minor changes in construction, combination, and arrangement of parts may be made without departing from the spirit and scope of the invention as claimed.

Having thus described our invention what we claim is:—

1. A potato harvester comprising a frame, an upwardly inclined conveyer carried by said frame, a transverse conveyer to receive potatoes from the upwardly inclined conveyer, means to separate vines from the potatoes while on the first conveyer, a vine conveyer disposed above the transverse conveyer to receive vines from the first named conveyer at the juncture of the latter with the transverse conveyer, a cleaner carried by the frame and receiving potatoes from the transverse conveyer, an assorter carried by the frame, means conveying potatoes from the cleaner to the assorter, and means receiving the assorted potatoes from the assorter and adapted to deliver them in separate receptacles.

2. A harvesting machine of the class described having an inclined conveyer at one side of the machine, a grader at and provided with discharge means at the opposite side of the machine, a cleaner intermediate said conveyer and grader, a transverse conveyer to transfer material from the first conveyer to the cleaner, a chute at the end of the cleaner opposite to said transverse conveyer and leading to the grader, said conveyer, grader and cleaner being disposed substantially in parallelism to afford a compact construction and shorter path for the material, and said cleaner and grader being inclined in crossing planes, a stripper disposed above the first conveyer, and a vine conveyer in line with and at the rear of the first conveyer and disposed over the transverse conveyer.

In testimony whereof we affix our signatures in presence of two witnesses.

WILLIAM T. TRAVIS.
PAUL J. TRAVIS.

Witnesses:
  OTHO F. MEARS,
  BENJ. W. MEARS.